United States Patent [19]
Hamaya

[11] Patent Number: 5,678,828
[45] Date of Patent: Oct. 21, 1997

[54] SEALING DEVICE

[75] Inventor: Yasunari Hamaya, Fukushima, Japan

[73] Assignee: NOK Corporation, Tokyo, Japan

[21] Appl. No.: 550,372

[22] Filed: Oct. 30, 1995

[30] Foreign Application Priority Data

Oct. 28, 1994 [JP] Japan ................................ 6-289286

[51] Int. Cl.$^6$ ........................................... F16J 15/00
[52] U.S. Cl. ........................... 277/58; 277/152; 277/188 A
[58] Field of Search .............................. 277/58, 152, 153, 277/188 R, 188 A, 165, 227

[56] References Cited

U.S. PATENT DOCUMENTS

| | | | |
|---|---|---|---|
| 3,495,843 | 2/1970 | Andersen et al. | 277/188 R |
| 4,300,778 | 11/1981 | Gagne | 277/188 A |
| 4,566,702 | 1/1986 | Traub | 277/152 |
| 5,326,112 | 7/1994 | Paykin | 277/188 R |
| 5,380,016 | 1/1995 | Reinsma et al. | 277/152 |
| 5,509,666 | 4/1996 | Abraham et al. | 277/152 |

FOREIGN PATENT DOCUMENTS

| | | | |
|---|---|---|---|
| 2573502 | 5/1986 | France | 277/152 |
| 3830708 | 3/1990 | Germany | 277/152 |
| 64-36765 | 3/1989 | Japan . | |

*Primary Examiner*—Daniel G. DePumpo
*Attorney, Agent, or Firm*—Jacobson, Price, Holman & Stern, PLLC

[57] ABSTRACT

A sealing device comprises an annular first seal member composed of a rubber-like elastic member and a metal ring member for reinforcement and an annular second seal member composed of a sliding member formed of a resin material and a rubber-like elastic member. The first seal member is provided with a seal lip extending towards a fluid side to be sealed and slidably contacting, in a sealed manner, an objective rotational shaft which is slidable relative to the seal lip, and the first seal member is also with provided an annular recessed portion, formed to an end surface of the first seal member on a side opposite to the fluid side, to which the second seal member is fitted. The second seal member has an endless shape. An outer peripheral portion of the elastic member of the second seal member is engaged with an inner peripheral wall of the annular recessed portion of the first seal member, and the sliding member of the second seal member slidably contact, in a sealed manner, the rotational shaft.

12 Claims, 2 Drawing Sheets

SEALING DEVICE

BACKGROUND OF THE INVENTION

The present invention relates to a sealing device applied to a portion, at which a bearing is disposed, of an iron-steel rolling mill, for example.

Accordingly to a conventional arrangement in this field of art field, as shown in FIG. 2A, there is provided an oil seal 100, as a sealing device of this kind, having a seal lip 101 formed of an elastic rubber material. Such an oil seal 100 is usually fitted between a housing 102 and a rotational shaft 103 rotatably supported by the housing 102 through a rotational bearing 104 such that the seal lip 101 of the oil seal 100 slidably contacts, in a sealed manner, an outer periphery of the rotational shaft 103.

However, in the structure of such an oil seal 100 formed of an elastic rubber material, there is a fear that foreign material such as iron powder or sharp dust will invade from an external atmosphere side into a gap between the seal lip 101 and the rotational shaft 103. Such invasion of the foreign material will damage the seal lip 101 or the seal lip 101 will be excessively worn by the foreign material, thus providing a problem.

In order to obviate this problem, in a prior art arrangement, there is an oil seal of the type in which such foreign material is caused to flow out by grease automatically supplied from the atmosphere side predetermined time intervals to the sliding surface of the seal lip 101.

Although this prior art technology may protect the oil seal, it is problematic in that the consumption of grease is excessive.

In another example of prior art, there is a compound type packing 110 such as that which is shown in FIG. 2B, which comprises a sliding member 110b formed of a hard resin material slidably contacting, in a sealed manner, the rotational shaft 103 and a rubber-like elastic member 110a provided on the back surface of the resin sliding member 110b. The packing 110 is fitted into a groove 111 formed in a housing 102.

Since this packing 110 is formed of a hard resin material, it may be less susceptible to damage from iron powder or sharp dust. It is, however, inferior in its follow-up characteristic for rotation and tight sealing property with respect to the rotational shaft 103. In addition, since the groove 111 has to be formed by cutting one circumferential portion of the housing so as to provide a rectangular cross section, an unstable sealing performance will be achieved at the cut surface. Thus, there are problems associated with this method, as well.

SUMMARY OF THE INVENTION

An object of the present invention is to substantially eliminate defects or drawbacks encountered in the prior art described above and to provide a sealing device provided with a seal lip capable of achieving an improved sealing performance and preventing a foreign material from entering into a sliding portion of the seal lip.

This and other objects of the present invention can be achieved by providing a sealing device which comprises an annular first seal member composed of an elastic member and a metal ring member for reinforcement, and an annular second seal member composed of a sliding member and an elastic member, wherein the first seal member is provided with a seal lip extending towards a fluid side to be sealed and slidably contacting, in a sealed manner, an object member which is slidable relative to the seal lip, and the first seal member is also provided with an annular recessed portion, formed to an end surface of the first seal member on a side opposite to the fluid side, to which the second seal member is fitted, and wherein the second seal member has an endless shape, an outer peripheral portion of the elastic member of the second seal member is engaged with an inner peripheral wall of the annular recessed portion of the first seal member and the sliding member of the second seal member slidably contacts, in a sealed manner, the object member to be sealed.

In a preferred embodiment, the following features will be further achieved. The elastic members of the first and second seal members are formed of an elastic rubber material and the slidable member of the second seal member is formed of a resin material. The annular recessed portion is defined by the metal ring member of the first seal member. The metal ring member is composed of an outer cylindrical portion, an end flanged portion extending radially inwardly from one end, on a side opposite to the fluid side to be sealed, of the outer cylindrical portion, an inner cylindrical portion extending from an inner end portion of the flanged portion towards the fluid side to be sealed, and an inner radial flanged portion extending radially from an end portion of the inner cylindrical portion on the fluid side to be sealed. The annular recessed portion is defined by the inner cylindrical portion and the inner radial flanged portion of the metal ring member.

The second seal member is an endless ring having a rectangular cross section and is formed as a laminate of the elastic member disposed outside and the sliding member disposed inside so that the sliding member is pressed against the slidable object member by an elastic force of the elastic member.

The elastic member of the second seal member has an outer periphery on which a plurality of annular projections are provided, which contact, in a fluid tight manner, the inner periphery of the metal ring member.

According to the present invention having the characteristics described above, the fluid to be sealed can be sealed by the first seal member which contacts, in a sealed manner, a slidable object member such as a rotational shaft, and on the other hand, a foreign material such as dust invading from a side opposite to the fluid side can be blocked from entering by the resin sliding member of the second seal. Thus, substantially no fluid and no dust invade into the seal lip portion of the sealing device, thus preventing damage thereto, and hence, it is not necessary to supply grease continuously, or with predetermined intervals, as in the prior art.

Even if the fluid leaks through the seal lip of the first seal member, the flow-out thereof can be prevented by the sliding member of the second seal member, the sealing performance thus being improved.

Since the second seal member is formed as a laminate of the elastic member disposed outside and the sliding member disposed inside, the sliding member is pressed against the slidable object member by an elastic force of the elastic member, and accordingly, a pressure applied on the seal surface can be kept properly.

Since the second seal member is formed as an endless member and is fitted to the annular recessed portion of the first seal member, the object member to be sealed can be sealed at its entire peripheral surface. Since the recessed portion is formed by the metal ring, the second seal member can be firmly fixed at its outer peripheral portion.

Furthermore, since a plurality of annular projections are provided on the outer peripheral surface of the elastic member of the second seal member so as to contact, in a fluid tight manner, the inner periphery of the metal ring member, the outer periphery of the second seal member can be surely sealed.

The nature and further features of the present invention will be made more understandable from the following description made in conjunction with the accompanying drawings.

BRIEF DESCRIPTION OF THE DRAWINGS

In the accompanying drawings:

FIG. 1 shows a view of a sealing device according to the present invention which is applied to a member to be sealed, in which

DESCRIPTION OF THE PREFERRED EMBODIMENT

The present invention will be described hereunder with reference to the accompanying drawings.

Figure 1A:
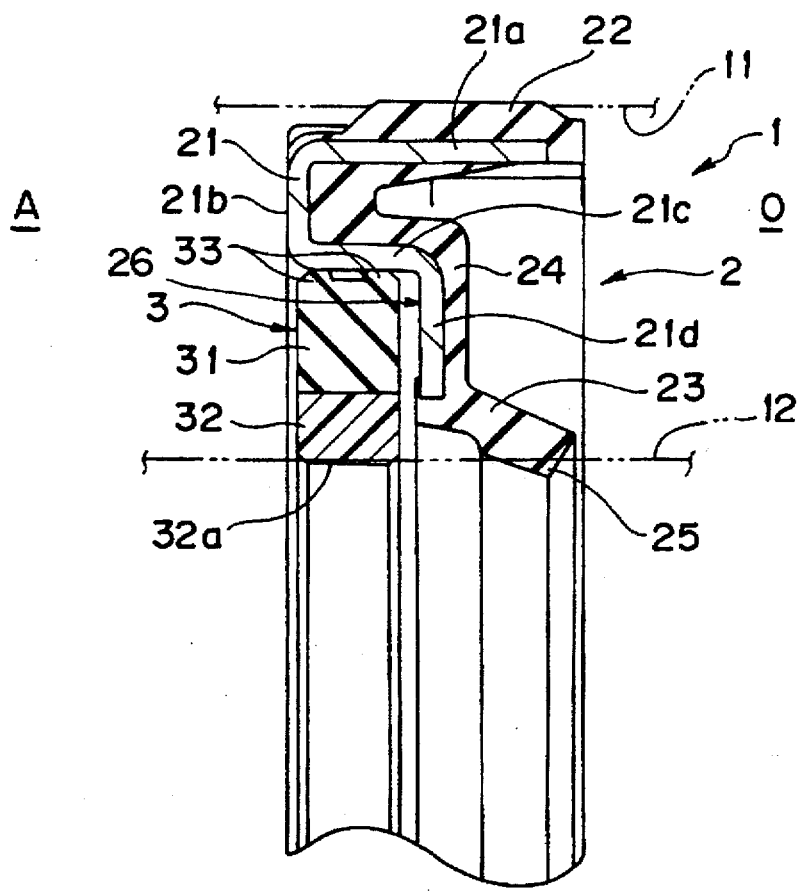
FIG. 1A shows a partially sectional view of the sealing device and FIGS. 1B and 1C are views showing states that the sealing devices are applied to the members to be sealed, respectively.

FIG. 1 shows one embodiment of the sealing device of the present invention, in which the sealing device is totally designated by reference numeral 1. The sealing device 1 comprises an annular first seal member 2 provided with a rubber-like elastic member 24 and a metal ring 21 for reinforcement and an annular second seal member 3 provided with a sliding member 32 formed of a resin material and a rubber-like elastic member 31.

The first seal member 2 is an annular member having a U-shaped section opened to a side O of a fluid to be sealed and is provided with an outer peripheral seal portion 22 fitted to an inner periphery of a housing 11 and a seal lip 23 contacting, in a sealed manner, the outer periphery of a rotational shaft 12, the seal lip 23 being disposed so as to be slidable with respect to the rotational shaft 12.

The metal ring 21 is composed of an outer cylindrical portion 21a embedded in the outer peripheral seal portion 22, an end flanged portion 21b extending radially inwardly from one end, on a side opposite to the side O of the fluid to be sealed, of the outer cylindrical portion 21a, an inner cylindrical portion 21c extending from an inner end portion of this flanged portion 21b towards the fluid side to be sealed, and an inner radial flanged portion 21d extending radially from an end portion of the inner cylindrical portion 23c on the fluid side O to be sealed.

The elastic member 24 formed of a rubber-like elastic material is baked continuously on the inside surface of the outer cylindrical portion 21a of the metal ring 21, the sealed fluid side surface of the end flanged portion 21b, the outside surface of the inner cylindrical portion 21c and the sealed fluid side surface of the inner radial flanged portion 21d. The seal lip 23 extends towards the fluid side O to be sealed in an axial direction from the end portion of the flanged portion 21d so that a front end portion of the seal lip 23 contacts fluid-tightly the rotational shaft 12.

The metallic surface portions of the metal ring 21 are exposed at the atmospheric side A of the flanged portion 21a, the inner periphery of the inner cylindrical portion 21c and the atmospheric side of the flanged portion 21d. An annular recessed portion 26, to which the second seal member 3 is fitted, is defined by the inner cylindrical portion 21c and the inner radial flanged portion 21d.

The second seal member 3 is an endless ring having a rectangular cross section and is composed of, as a laminate, a ring-shaped rubber-like elastic member 31 disposed to the outer peripheral side and a ring-shaped resin sliding member 32 disposed to the inner peripheral side so that the resin sliding member 32 is pressed against the rotational shaft 12 by the elastic force of the elastic member 31.

The outer periphery of the rubber-like elastic member 31 is engaged with the inner periphery of the inner cylindrical portion 21c of the metal ring 21 constituting the inner peripheral wall surface of the annular recessed portion 26, and the sliding surface 32a formed to the inner periphery of the resin sliding member 32 contacts, in a sealed manner, the rotational shaft 12 to be slidable. Since the annular recessed portion 26 of the first seal member 2 is formed by the metal ring 21, the outer periphery of the second seal member 3 can be firmly fixed.

A plurality of annular projections 33 are provided on the outer peripheral surface of the rubber-like elastic member 31 of the second seal member 2, and these projections contact, in a fluid tight manner, the inner periphery of the inner cylindrical portion 21c of the metal ring 21.

Figure 1B:
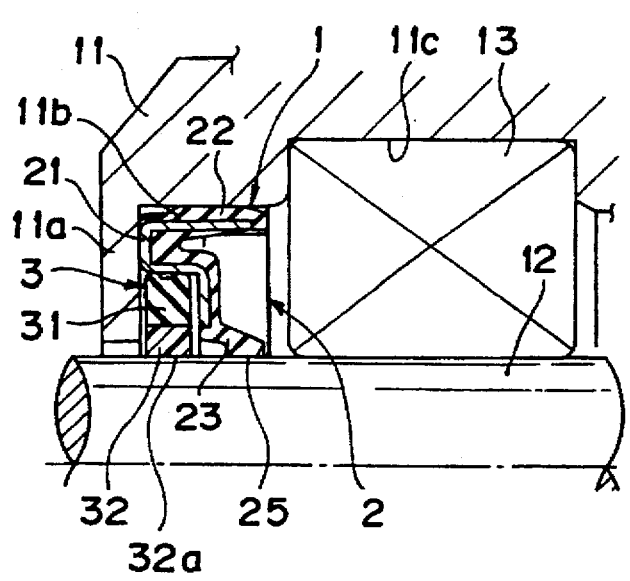

FIG. 1B shows a mounting condition wherein the sealing device of the structure described above is applied to the bearing portion of a iron-steel rolling mill or the like.

Referring to FIG. 1B, the sealing device 1 is disposed between the housing 11 and the rotational shaft 12 rotatably supported by the housing 11 through the rotational bearing 13 and is mounted on the atmosphere side of the rotational bearing 13, thereby acting to seal the grease from the rotational bearing 13 and prevent dust such as iron powder or other powder material from invading into the rotational bearing portion from the atmosphere side.

There are provided, on the inner periphery of the housing 11, a bearing mount 11c to which the rotational bearing 13 is mounted, a sealing device mounting portion 11b disposed on the atmosphere side of the bearing mount 11c and having diameter smaller than that of the bearing mount 11c, and an end wall portion 11a disposed further on the atmosphere side of the sealing device mounting portion 11b.

The sealing device 1 according to the present invention is fitted to the housing 11 so that the first seal member 2 is disposed on the rotational bearing 13 side, i.e. fluid side, and the second seal member 3 is disposed on the atmosphere side A. In this fitting operation, the end flanged portion 21b of the first seal member 2 abuts against the end wall portion 11a of the housing 11 to thereby surely position the sealing device 1 in its axial direction.

Figure 1C:
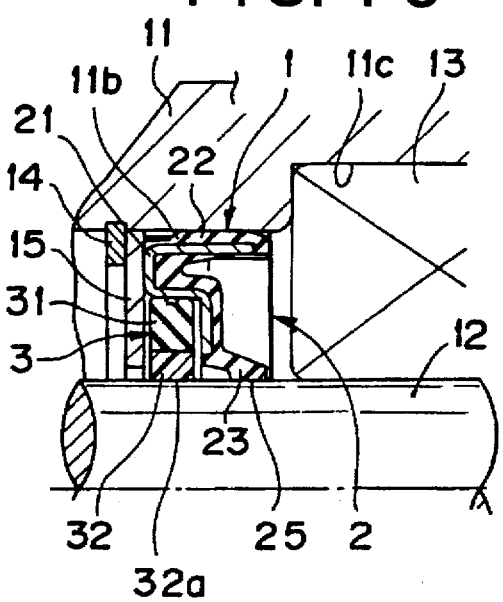
Figure 2A:
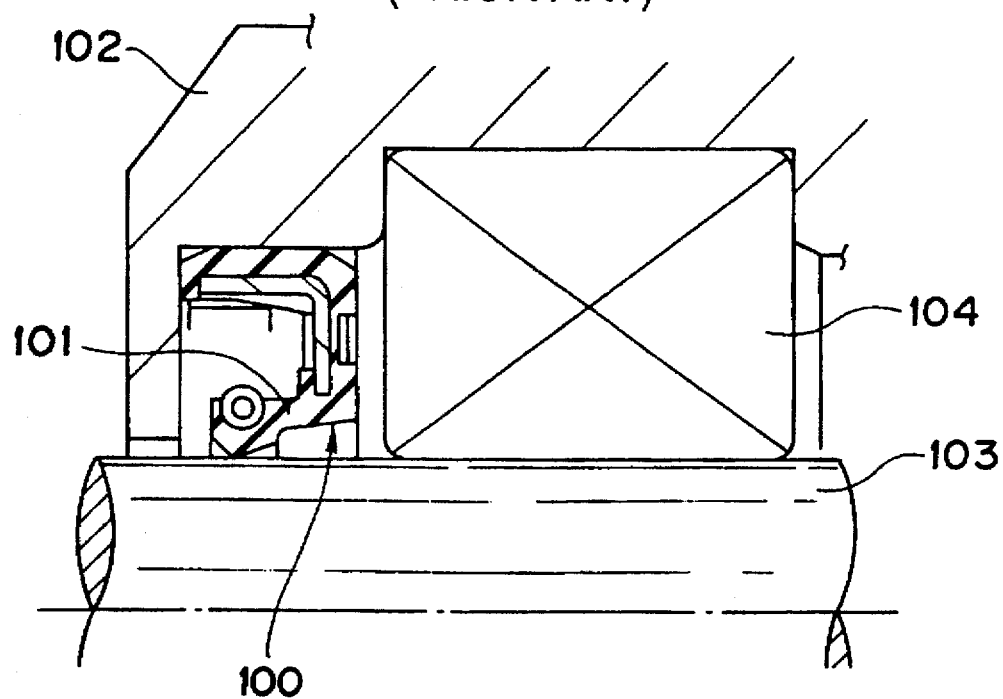
FIGS. 2A and 2B are views showing sealing devices, according to the prior art, which are applied to members to be sealed.
Figure 2B:
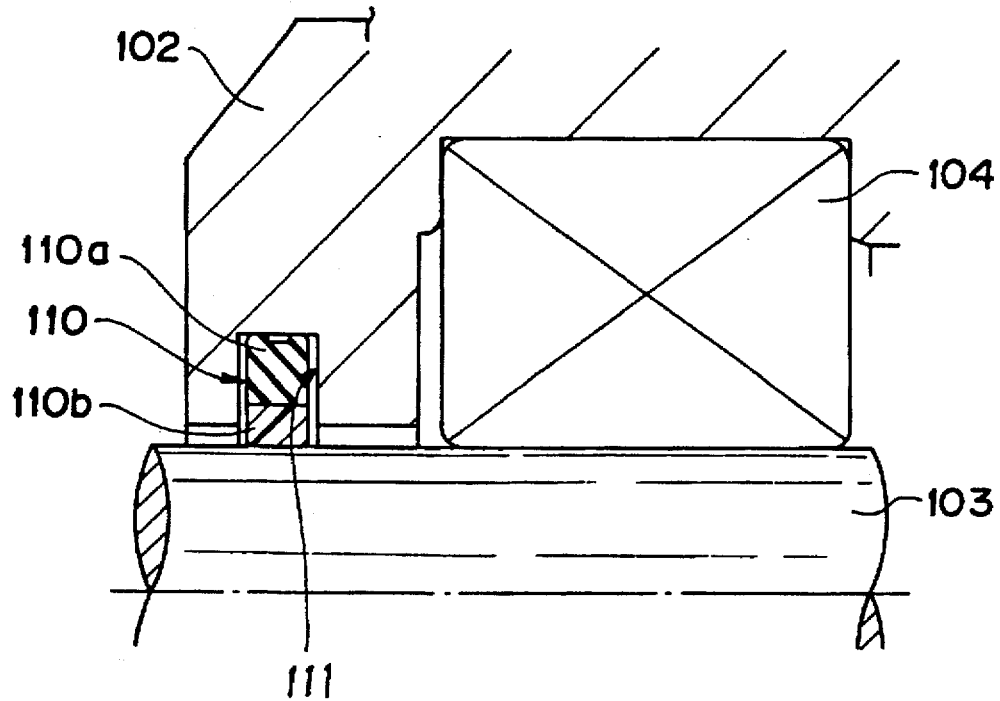

In a modification shown in FIG. 1C, the positioning of the sealing device is made, in place of the end wall 11a of the housing 11 of the former embodiment, by means of a spring 14 engageable with the inner periphery of the housing 11 through a positioning plate 15.

According to the embodiment of the present invention described above, the fluid to be sealed, such as lubricant for the rotational bearing 13, is sealed by the seal lip 23 of the first seal member 2 contacting, in a sealed manner, the rotational shaft 12. On the other hand, dust invading from the atmosphere side is blocked to enter into the sliding portion of the seal lip 23 by the resin sliding member 32 of the second seal member 3. Accordingly, the seal lip 23 will never be damaged by the dust from the atmosphere side, and hence, there is no need for continuously supplying the grease as in the prior art. In this manner, the lubricant for the rotational bearing 13 can be substantially completely sealed, thus reducing an grease consumption.

Furthermore, even if the fluid to be sealed such as lubricant leaks from the seal lip of the first seal member 2, the leakage of the fluid will be surely blocked by the resin sliding member 32 of the second seal member 2, thus improving the sealing performance for the fluid to be sealed.

The resin sliding member 32 is kept in a condition pressed by an urging force of the rubber-like elastic member 31 formed on the back surface thereof to thereby surely keep the suitable surface sealing pressure to the rotational shaft 12. Particularly, since the second seal member 3 having an endless shape is fitted to the annular recessed portion 26 of the first seal member 2, the rotational shaft 12 can be sealed at its entire outer peripheral surface.

Still furthermore, since the annular projection 33 is formed to the outer periphery of the second seal member 3 having the rubber-like elastic member and it is tightly contacted to the inner periphery of the recessed portion 26 of the first seal member 2, the outer periphery of the second seal member 3 can be surely sealed.

What is claimed is:

1. A sealing device comprising:

an annular first seal member comprising an elastic member and a metal ring member for reinforcement; and an annular second seal member shaped as an endless ring having a substantially rectangular cross section and comprising a sliding member and an elastic member, wherein said first seal member is provided with a seal lip extending toward a fluid side to be sealed and slidably contacting, in a sealed manner, an object member which is slidable relative to the seal lip, and the first seal member is also provided with an annular recessed portion formed to an end surface of the first seal member on a side opposite to the fluid side, to which said second seal member is fitted, said seal lip being positioned apart from said second seal member, and wherein a radially outer peripheral portion of the elastic member of the second seal member is engaged with a radially inner peripheral wall of the annular recessed portion of the first seal member, and the sliding member of the second seal member slidably contacts, in a sealed manner, the object member to be sealed.

2. The sealing device according to claim 1, wherein said elastic members of the first and second seal members are formed of an elastic rubber material and the slidable member of the second seal member is formed of a resin material.

3. The sealing device according to claim 1, wherein said annular recessed portion is defined by said metal ring member of the first seal member.

4. The sealing device according to claim 3, wherein said metal ring member comprises a radially outer cylindrical portion, an end flanged portion extending radially inwardly from one end, on a side opposite to the fluid side to be sealed, of the radially outer cylindrical portion, a radially inner cylindrical portion extending from a radially inner end portion of the flanged portion toward the fluid side to be sealed, and a radially inner radial flanged portion extending radially from an end portion of the radially inner cylindrical portion on the fluid side to be sealed.

5. The sealing device according to claim 4, wherein said annular recessed portion is defined by the radially inner cylindrical portion and the radially inner radial flanged portion of the metal ring member.

6. The sealing device according to claim 1, wherein said second seal member is formed as a laminate of the elastic member disposed outside and the sliding member disposed inside so that the sliding member is pressed against the slidable object member by an elastic force of the elastic member.

7. The sealing device according to claim 1, wherein said elastic member of the second seal member has a radially outer periphery on which a plurality of annular projections are provided, which contact, in a fluid tight manner, a radially inner periphery of the metal ring member.

8. The sealing device of claim 1, wherein said sliding member further comprises a sliding surface arranged so as to face said object member, said sliding member having chamfered edges at said sliding surface.

9. The sealing device of claim 4, wherein said radially outer cylindrical portion is substantially parallel to said radially inner cylindrical portion.

10. The sealing device of claim 4, wherein said second seal member is directly fitted to a radially inner surface of said radially inner cylindrical portion.

11. The sealing device of claim 1, wherein said sealing device is arranged so as to seal a bearing.

12. The sealing device of claim 1, wherein said sealing device is arranged so as to seal a bearing of an iron-steel rolling mill.

* * * * *